United States Patent Office 3,374,239
Patented Mar. 19, 1968

3,374,239
6-CHLORO-2-(5-NITRO-2-FURYL) CINCHONINIC ACID
Homer Albert Burch, Norwich, N.Y., assignor to The Norwich Pharmacal Company, a corporation of New York
No Drawing. Filed Nov. 25, 1966, Ser. No. 596,826
2 Claims. (Cl. 260—287)

---

ABSTRACT OF THE DISCLOSURE

Antibacterially active 6-chloro-2-(5-nitro-2-furyl)cinchoninic acid and a method for its preparation.

---

This invention relates to a new chemical compound, 6-chloro-2-(5-nitro-2-furyl)cinchoninic acid, of the formula:

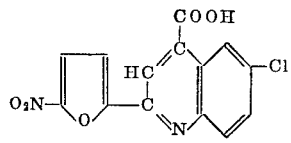

and to compositions containing it.

This compound is crystalline and lowly water soluble. It inhibits the growth of numerous bacterial such as *Staphylococcus aureus, Escherichia coli, Streptococcus pyogenes, Streptococcus agalactiae* and *Erysipelothrix insidiosa* in very low concentration as shown below.

| Organism: | Inhibiting conc. in mg./percent |
|---|---|
| S. aureus | 1.25 |
| E. coli | 1.25 |
| S. pyogenes | 0.03 |
| S. agalactiae | 0.15 |
| E. insidiosa | 0.07 |

Because of its ability to prevent the growth of bacterial organisms, it is useful as the active ingredient in compositions intended to prevent and control the presence of such organisms.

It has also been found that this compound, when admixed in the food supply of fowl, is a useful medicating poultry feed additive. Thus, when administered at a concentration of 0.011% by weight in the diet of chickens infected with *Salmonella gallinarum*, an organism provocative of salmonellosis, control of infection in at least 50% of the birds is effected.

The method which is currently preferred for the preparation of the compound of this invention consists in reacting 5-chloroisatin with methyl furyl ketone in the presence of a base such as sodium hydroxide and advantageously under the influence of heat to secure a salt of 6-chloro-2-(2-furyl)cinchoninic acid; generation of the acid from its salt by acidification and its recovery; followed by nitration thereof with a nitrant such as mixed acid under conditions usually imposed.

In order that the preparation of the compound of this invention may be fully available to and understood the following synthesis is set forth:

To 375 ml. of 30% aqueous sodium hydroxide solution is added 87.5 gm. (0.48 mole) of 5-chloroisatin. The mixture is heated on a steam bath for 15 minutes; 53 gm. (0.48 mole) of methyl furyl ketone is added and heating continued for an additional 15 minutes. The mixture is cooled in an ice bath and the sodum salt of the product is collected by filtration. The salt is dissolved in a minimum amount of water and the solution acidified with concentrated hydrochloric acid. The mixture is cooled and the free acid collected by filtration. Recrystallization from glacial acetic acid gives 6-chloro-2-(2-furyl)cinchoninic acid in a yield of 59 gm. (45%), melting at 285–287°.

A 500 ml., 3 neck flask, fitted with a stirrer and set in an ice bath, is charged with 200 ml. of concentrated sulfuric acid and 36 gm. (0.16 mole) of 6-chloro-2-(2-furyl)cinchoninic acid is added in small portions below 10°. After cooling the solution to 0°, a solution of 13 ml. of concentrated sulfuric acid and 13 ml. (0.21 mole) of concentrated nitric acid is added dropwise at less than 5°. The solution is stirred for an additional 15 minutes before pouring it into 2.5 l. of ice water. The orange colored product is collected by filtration, washed well with water and recrystallized from dilute aqueous dimethylformamide. The product separates in a yield of 26 gm. (62%) decomposing at 293–295°.

*Analysis.*—Calcd. for $C_{14}H_7ClN_2O_5$: C, 52.76; H, 2.21; N, 8.79. Found: C, 52.73; H, 2.24; N, 8.72.

What is claimed is:
1. 6-chloro-2-(5-nitro-2-furyl)cinchoninic acid.
2. A method of preparing the chemical compound of claim 1, which comprises: reacting 5-chloroisatin with methyl furyl ketone in the presence of a base to obtain 6-chloro-2-(2-furyl)cinchoninic acid, generating the acid from its salt by acidification and nitrating the said acid.

References Cited

UNITED STATES PATENTS 3,272,828  9/1966  Von Esch et al. ___ 260—287 X

OTHER REFERENCES

Miura et al.: Chem. Pharm. Bull., vol. 13, pp. 525–8 (1965).

Ciusa et al.: Abstracted in Chem. Abstr., vol. 32, col. 4586(5), 1938.

NICHOLAS S. RIZZO, *Primary Examiner.*